United States Patent [19]

Yanagawa et al.

[11] Patent Number: 4,825,982

[45] Date of Patent: May 2, 1989

[54] EXHAUST BRAKE SYSTEM

[75] Inventors: Ichiro Yanagawa; Yuzi Wachi, both of Higashimatsuyama, Japan

[73] Assignee: Jidosha Kiki Co., Ltd., Japan

[21] Appl. No.: 26,276

[22] Filed: Mar. 16, 1987

[30] Foreign Application Priority Data

Mar. 20, 1986 [JP] Japan ............................ 61-40622[U]

[51] Int. Cl.[4] ........................ F02D 9/06; B60T 11/10; F01B 25/22

[52] U.S. Cl. .................................... 188/273; 188/154; 92/150 A

[58] Field of Search ....................... 188/154, 273, 123; 251/63.6; 92/103 A

[56] References Cited

U.S. PATENT DOCUMENTS

| | | | |
|---|---|---|---|
| 3,379,405 | 4/1968 | Natho . | |
| 3,885,458 | 5/1975 | Wright | 92/130 A X |
| 3,958,592 | 5/1976 | Wells | 137/315 |
| 4,054,156 | 10/1977 | Benson | 188/273 X |
| 4,601,457 | 7/1986 | Austin et al. | 92/130 A X |

FOREIGN PATENT DOCUMENTS

| | | | |
|---|---|---|---|
| 864508 | 4/1961 | United Kingdom | 7/6 |

*Primary Examiner*—Andres Kashnikow
*Assistant Examiner*—Richard Potosnak
*Attorney, Agent, or Firm*—McGlew & Tuttle

[57] ABSTRACT

An exhaust brake incorporates a slide valve with a decreasing returning or opening effort without also having an increased working or closing effort of its valve elements incorporated therein. The brake system includes a first valve piston connected to a closing slide valve and adapted to move in reciprocating motion inside a cylinder under an operating pressure supplied thereto, and in addition, a second valve piston adapted to be driven in rectilinear motion under the operating pressure in the cylinder so as to work upon a resilient member to be deformed resiliently. When opening the slide valve, a restoring effort of the resilient member is relayed effectively to the first valve piston through a transmitting member to work in assistance with the returning motion of the valve piston.

3 Claims, 2 Drawing Sheets

EXHAUST BRAKE SYSTEM

BACKGROUND OF THE INVENTION

Field of the Invention

The present invention relates in general to brake systems and in particular to an exhaust brake system incorporating a slide type valve.

Generally, it is known that an exhaust brake system is adapted to render a load upon a prime mover or an engine by closing a valve incorporated in the exhaust gas passage of the engine, thus producing a braking effect to be relayed upon the driving wheels of a vehicle, and such an exhaust brake system is employed mainly in a large-sized vehicle such as a motor truck or a motorbus. For this type of exhaust brake system, there are generally two types of mechanism employed, that is, a slide valve type and a rotary valve type. In an exhaust brake of slide valve type, it is inevitable that a substantial resistance may be rendered upon the sliding motion of the valve elements when used under a large exhaust pressure, which may possibly make the action of a valve element involved not smooth particularly in its returning motion.

In this respect an arrangement has been suggested as shown in FIG. 2, including an exhaust brake system such that there are two return springs 3 employed for a valve piston 2 for driving a closing valve 1. In FIG. 2, there are shown an exhaust pipe designated at the reference numeral 4, a valve cylinder at 5, a pressure chamber at 6, an atmospheric pressure chamber at 7 and a piston rod at 8. In this exhaust brake system, when compressed air is introduced into the pressure chamber 6, the valve piston 2 is caused to move along the valve cylinder 5 downwardly as viewed in FIG. 2 against the urging force of the return spring 3, and when the exhaust pipe 4 is closed by the closing valve 1, the exhaust brake is put into operation. And, when compressed air within the pressure chamber 6 is exhausted outside, the valve piston 2 is caused to move upwardly as viewed in FIG. 2 in its return stroke under the urging force of the return spring 3, thereby causing the closing valve 1 to be opened to release the exhaust brake system. When the valve piston 2 is in its return stroke with the closing valve 1 being put under a current exhaust pressure, there is a relatively large resistance against the sliding motion of the closing valve 1, however, the valve piston 2 may turn to move relatively smoothly in its return motion by virtue of the increased effect of urging given from two return springs 3 as provided in this arrangement.

However, with an increased urging force available from the return springs 3 in this arrangement of the exhaust brake system, the period of tthe working or opening effort or the valve piston 2 may possibly become short. In order to compensate for such shortage in the working effort, it would be necessary to have an increased working diameter of the cylinder 5, which is another inconvenience in design.

In coping with such a contradictory requirement, there is proposed such an improvement in the design of the exhaust brake system as typically shown in FIG. 3. This specific construction is contemplated in an attempt to have only the initial returning force of the valve piston 2 increased, in which a valve cylinder 5 may have an average diameter, not in excess from the general design. More specifically, by virtue of such an advantageous arrangement that the valve piston 2 is adapted to bias an auxiliary return spring 9 at the completion of working stroke, the working effort of the valve piston 2 would not become short in practice. On the other hand, however, it is notable that there is a greatest resistance against the sliding motion of the closing valve 1 only at the initial stage of the returning stroke of the valve, which would then lead to a sudden decrease in the pressure differential across the closing valve 1, once it opens to a certain extent, thus resulting in a substantial decrease in the resistance against the sliding motion of the valve element. The arrangement as shown in FIG. 3 is contemplated in consideration of the above, in which the valve piston 2 is pushed along with its returning motion by the auxiliary return spring 9 only at the initial stage of returning motion of the piston 2.

With such an improvement in construction of an exhaust brake system as noted above, it is pointed out that this system has such drawbacks as follows. More specifically, the system shown in FIG. 3 has drawbacks at the end of a working stroke of the valve piston 2 when it comes to abut the auxiliary return spring 9. At this point there is produced the greatest differential pressure across a closing valve 1, thus having an increased resistance against the sliding motion of the piston. For this reason, the closing valve 1 must be shut-off as soon as practicably possible.

It is inevitable, however, that there occurs a substantial decrease in the working effort of the valve piston 2 upon its abutting against the auxiliary return spring 9, which means a possible deley in the completion of a shut-off action of the closing valve 1.

SUMMARY OF THE INVENTION

The present invention is essentially directed to the provision of an efficient and useful resolution to such drawbacks particular to the conventional construction of the exhaust brake system, for the purpose of attaining as increased working effort of a valve piston without any sacrifice relating to decreasing the returning effort of the piston during its returning stroke from start to ending points.

In an attempt to solve the problem as noted above, the present invention is contemplated to provide an improvement in an exhaust brake system of the type incorporating a closing slide valve mechanism disposed in an exhaust passage of an engine and connected to a first valve piston mounted operably in reciprocating motion within a pneumatic cylinder fed with an operating pressure so that the closing valve may work for the actuation of the exhaust brake system, which comprises, as briefly summarized, (a) a resilient means, (b) a second piston means adapted to be driven in reciprocating motion under operating pressure to cause the resilient means to be deformed resiliently, and (c) a transmitting means adapted, when the operating pressure is relieved, to render its restoring effect upon the first valve piston to be urged in assistance to its returning motion.

With the improvement in construction of an exhaust brake system as noted above, when closing the closing valve mechanism by the first valve piston shifting in a working stroke, it is arranged that the second valve piston may also operate in reciprocating motion to force the resilient member to be urged resiliently, while having the first valve piston left unabutting against the resilient member in its working stroke. By virtue of such a unique arrangement, there is effected no damping in the working effort of the first valve piston under the resistance of the resilient member, thus providing an unrestricted and smooth closing motion of the closing valve mechanism, and thus resulting in a due response of the exhaust brake system, accordingly. By having working effort of the first valve piston, without having any increased diameter of the pneumatic cylinder, which it is possible to have a compact design of the entire exhaust brake system. On the other hand, it is also according to the invention when opening the closing valve mechanism by the returning motion of the first valve piston, the restoring effect of the resilient member 28 assists in causing returning motion of the first valve piston by way of the transmitting member. With this arrangement, there is attainable a corresponding increase in the returning effort of the first valve piston, which may substantially contribute to a smooth opening motion of the closing valve mechanism against an increased resistance to the sliding motion of the closing valve mechanism at the start of its opening stroke from the shut-off position, thus resulting in a quick and smooth relieving of the exhaust brake system, accordingly.

Additional features and advantages of the invention will now become more apparent to those skilled in the art upon consideration of the following detailed description of a preferred embodiment exemplifying the best mode of carrying out the invention as presently perceived.

DETAILED DESCRIPTION OF THE INVENTION

Figure 1:
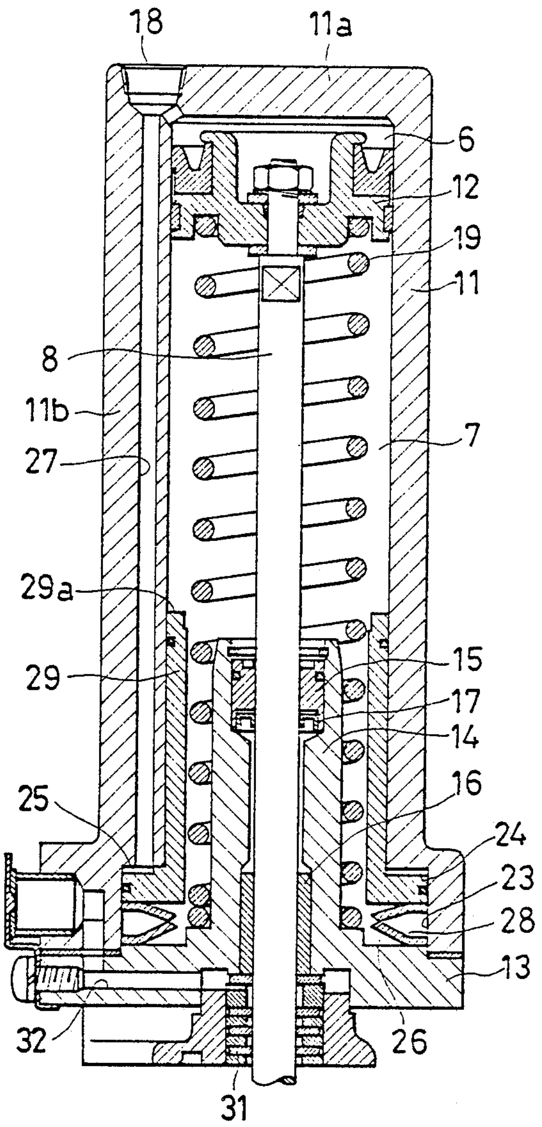
FIG. 1 is a longitudinal cross-sectional view showing the pneumatic cylinder of an exhaust brake system by way of a preferred embodiment of the invention.
Figure 2:
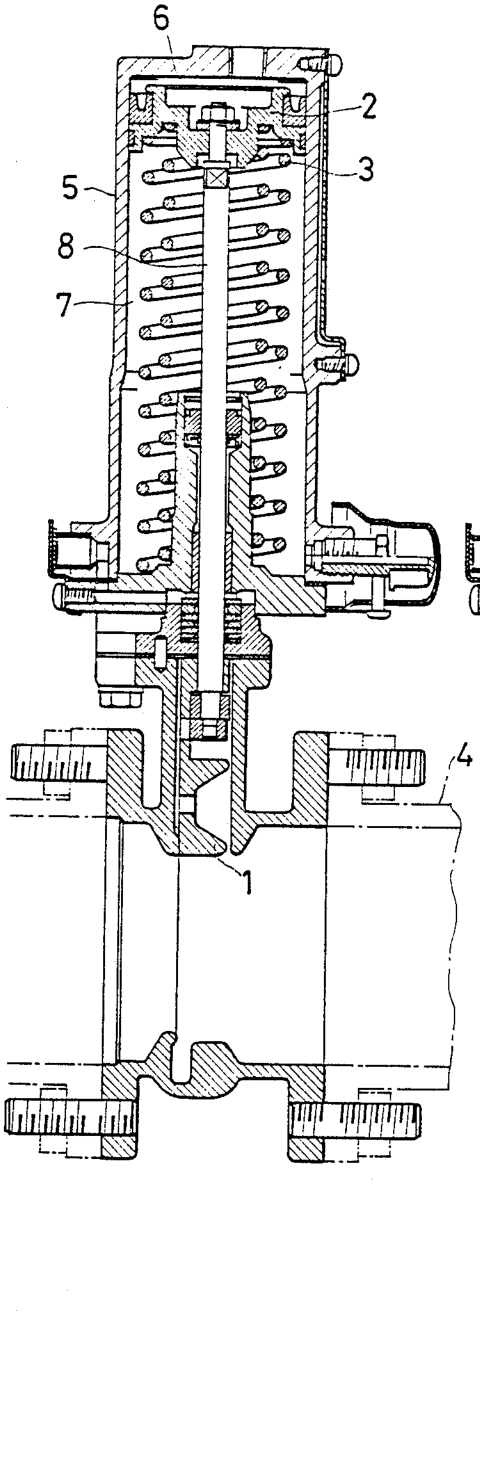
FIG.2 (PRIOR ART)
FIGS. 2 and 3 are longitudinal cross-sectional views showing the prior art exhaust brake systems, respectively.
Figure 3:
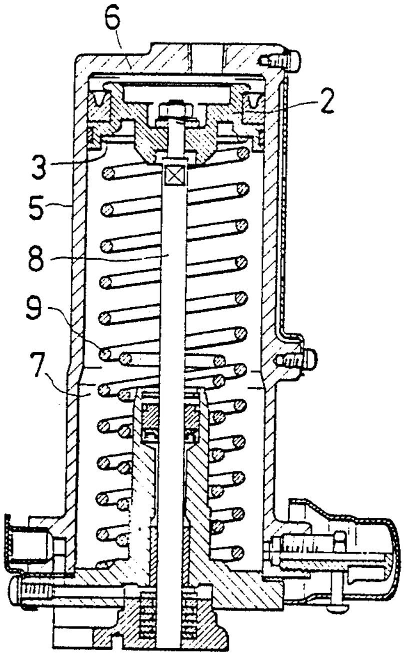
FIG.3 (PRIOR ART)

The present invention will now be more particularly described by way of a preferred embodiment thereof in conjunction with FIG. 1. FIG. 1 shows a pneumatic cylinder assembly of an exhaust brake system, in which like parts are designated by like reference numerals as in FIGS. 2 and 3. Referring specifically to FIG. 1, there is shown a first cylinder 11 of the exhaust brake system, which cylinder 11 is closed at its one end with an end portion 11*a* formed integrally with the first cylinder 11 itself, with the other end being closed with a end plate 13 separate from the first cylinder 11. It is seen that there is a boss portion 14 projecting upwardly into the inside of the cylinder 11 formed integrally therewith, and that there is a piston rod 8 extending slidably through the boss portion 14. Bearing bushes 15, 16 and a coupling member 17 are fitted together snugly into the recess, formed in the boss portion 14, these elements cooperate together to block exhaust gas from entering. A pressure chamber 6 is formed between a first piston 12 in the first cylinder 11 and the end portion 11*a* and is in communication with a pressure admitting port 18, which is in turn connected to an air storage tank through an electromagnetic valve or the like. With this construction, when the pressure chamber 6 is fed with compressed air, the first valve piston 12 is then biased in a downward working stroke as viewed FIG. 1 against the resilient force from a return spring 19. Incidentally, there is an atmospheric chamber 7 defined between the first valve piston 12 and the end plate 13, which chamber is in communication with the atmosphere by way of an atmospheric valve, not shown.

Also, there are provided a plurality of annular stepped portions having increasing diameters from that of the first cylinder 11 around the base end of the boss portion 14 disposed within the cavity of the cylinder 11. A second cylinder 23 is defined with these annular stepped portions and with the opposing inner circumference of the root of the first cylinder 11. There is also a second piston 24 of ring type fitted slidably along the inner circumference of the second cylinder 23, which is separated into a pressure chamber 25 and a resilient member chamber 26 by the second piston 24. This pressure chamber 25 is in communication with the pressure admitting port 18 by way of a passage 27 defined longitudinally along the inner circumference of a cylinderical side wall portion 11*b* of the first cylinder 11. On the other hand, there is disposed the resilient member 28 which is comprised of two coned disc springs set back to back against each other in the resilient member chamber 26. In operation, when the pressure admitting port 18 is put under pressure of compressed air, the second piston 24 is caused to be shifted downwardly as viewed in FIG. 1 against the resilient force from the resilient member 28, and when the pressure admitting port 18 allows compressed air to be discharged, the second piston 24 is caused to return upwardly as viewed in FIG. 1 under the effect of assistance with a restoring force from the resilient member 28. The resilient member chamber 26 is placed in communication with the atmospheric chamber 7.

The second piston 24 is formed integrally with a transmitting member 29 extending upwardly in cylindrical form. This transmitting member 29 is disposed fitting slidably in the inner circumference of the first cylinder 11 in such a manner that it is adapted in function to transmit a restoring force of the resilient member 28 in a compressed state to the first valve piston 12 along the direction of its returning stroke, thus assisting its returning motion. The upper end portion 29*a* of the transmitting member 29 is provided projecting slightly above the upper end of the boss portion 14 so as to have the upper end portion 29*a* of the transmitting member 29 urged upon by the first valve piston 12 at the end of its working stroke.

Also shown in FIG. 1 are a sealing washer 31 adapted to prevent exhaust gas leakage and an exhaust passage for discharging exhaust gas which has leaked out.

With such arrangement of the exhaust brake system according to the present invention, when compressed air is fed in through the pressure admitting port 18, the exhaust brake system is put into operation, and when the pressure admitting port 18 is in communication with the atmosphere, the exhaust brake system is then relieved of operation.

More specifically, in operation, when compressed air is fed through the pressure admitting port 18, it is then relayed to the pressure chambers 6 and 25, respectively. With this pressure urging upon the first valve piston 12 downwardly as viewed in FIG. 1 against the resilient force of the return spring 19, the closing valve mechanism, not shown, disposed in the exhaust passage of an engine is then caused to be closed so as to stop the passage of exhaust gas therethrough. As a consequence, there is rendered an exhaust pressure upon the engine as a working load, thus effecting the braking operation of the exhaust brake system. At this moment, as the second piston 24 is also caused to be lowered in working motion as viewed in FIG. 1 against a current pressure from the pressure chamber 25, the upper end portion 29*a* of the transmitting member 29 is then caused to be lowered to a level as high as that of the upper end portion of the boss portion 14. In this manner, as the first valve piston 12 does not abut upon the transmitting member 29 at the end of its working stroke, it is advantageous that there is attained a quick and complete closing motion of the closing valve mechanism without any sacrifices of its closing effort as well as the working effort of the first valve piston 12, accordingly.

Next, when the pressure admitting port 18 is put in communication with the atmosphere, compressed air existing in the pressure chambers 6 and 25 is directed outwardly, thus causing the first valve piston 12 to return upwardly as viewed in FIG. 1 under the resilient force from the return spring 19, and thus opening the closing valve mechanism. Consequently, an exhaust gas under pressure which has been working upon the engine is now eliminated to relieve the exhaust brake system in operation. At this moment, the second piston 24 is caused to return upwardly in its returning stroke as viewed in FIG. 1 under the restoring effect from the resilient member 28, while effecting the first valve piston 12 to be assisted along with its returning motion by way of the transmitting member 29 provided integrally with the second piston 24. As the stroke of the second piston 24 is not very long, the restoring effect of the resilient member 28 to assist the first valve piston 12 to be shifted along its returning motion is limited only to the initial stage of returning stroke of the first valve piston 12, but since a current differential pressure existing across the closing valve mechanism would soon decrease at a slight opening of the closing valve mechanism, thus reducing a current resistance working upon the sliding motion of the closing valve mechanism, the first valve piston 12 may travel smoothly along its returning stroke under the resilient force of the return spring 19 alone, which will thus result in a quick relieving response of the exhaust brake system, accordingly.

While the present invention is described herein by way of a single preferred embodiment thereof, it is to be understood that the present disclosure is to be considered as being exemplary of the principles of the invention, and is not intended to restrict the invention to such embodiment, but rather a variety of changes and modifications may be made in the present invention without departing from the spirit and scope thereof, as described in the body of specification and recited in the appended claims. For instance, while the restoring effect of the resilient member 28 is adapted to work upon the first valve piston 12 only at the start of its returning stroke in this embodiment, it is of course feasible in practice of the invention to apply this effect of restoring not only in the start of the returning stroke but also in the intermediate of stroke of the first valve piston 12, or further in continuation to the end of the stroke, in which case it suffices if the stroke of the second piston 24 is made longer correspondingly. While there is employed the resilient member 28 which is comprised of two coned disc springs by way of the embodiment of the present invention, it is equally possible in practice to adopt a variety of resilient members such as another type of resilient spring or rubber element, or else an enclosed air cylinder in place of the resilient member 28. Also, while the transmitting member 29 is formed integrally with the second piston 24 in the disclosure of the invention, it may naturally be formed as a separate member from the second piston 24, or as being integrally with the first valve piston 12. More specifically, since the purpose of providing the transmitting member 29 resides essentially in the attainment of the restoring effect of the resilient member 28 working in assistance upon the returning motion of the first valve piston 12, there may be a variety of constructions to be practiced to the same effect.

What is claimed is:

1. In an exhaust brake system including a slidable closing valve disposed in an exhaust gas passage of an engine, connected to a first piston reciprocally disposed in a cylinder and adapted to work so as to open and close said valve under the pressure of a fluid supplied into said cylinder, the improvement comprising: said cylinder including a first cylinder part defining a first interior cylinder space and a second cylinder part defining a widened second interior cylinder space, said first interior cylinder space having a first end and said first interior cylinder space having a second end adjacent said widened second interior cylinder space, said widened second interior cylinder space communicating with said first interior cylinder space, said widened second interior cylinder space having an upper end adjacent said second end and a lower end; said first piston positioned within said first interior space between said first end and said second end, said first piston and said first cylinder part forming a first pressure chamber; a return spring positioned within said cylinder biasing said first piston toward said first end; a second or piston positioned within said widened second interior cylinder space between said upper and said lower end, said second piston and said second cylinder part forming a second pressure chamber; a resilient member positioned within said cylinder biasing said second piston toward said upper end; a compressed air line carrying compressed air, said compressed air line including a first compressed air inlet connecting said compressed air line with said first pressure chamber adjacent said first end and a second compressed air inlet connecting said compressed air line with said second pressure chamber adjacent said upper end, compressed air entering said first pressure chamber acting to move said first piston toward said second end against the bias of said return spring, compressed air entering said second pressure chamber acting to move said second piston toward said lower end against the bias of said resilient member; and, a transmitting member connected to said second piston, said transmitting member adapted to urge said first piston toward said first end as said second piston is urged toward said upper end by said resilient means upon a release of compressed air from said compressed air line.

2. An exhaust brake system as claimed in claim 1, wherein said resilient means comprises a plurality of coned disc springs set back to back to each other disposed within said second cylinder part at said lower end.

3. An exhaust brake system as claimed in claim 1, wherein said transmitting member is formed integrally with said second piston.

* * * * *